(12) United States Patent
Lim et al.

(10) Patent No.: US 9,409,486 B2
(45) Date of Patent: Aug. 9, 2016

(54) CONTROL METHOD AND SYSTEM OF ELECTRIC VEHICLE

(71) Applicant: Hyundai Motor Company, Seoul (KR)

(72) Inventors: Jae-Sang Lim, Suwon (KR); Seongyeop Lim, Seoul (KR); Gubae Kang, Yongin (KR); Jiwan Cha, Incheon (KR); Youngun Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 22 days.

(21) Appl. No.: 14/530,300

(22) Filed: Oct. 31, 2014

(65) Prior Publication Data

US 2015/0175015 A1    Jun. 25, 2015

(30) Foreign Application Priority Data

Dec. 24, 2013 (KR) .......................... 10-2013-0162932

(51) Int. Cl.
*H02P 7/00* (2016.01)
*B60L 11/18* (2006.01)
(Continued)

(52) U.S. Cl.
CPC . *B60L 11/18* (2013.01); *B60K 1/00* (2013.01); *B60L 3/12* (2013.01); *B60L 11/1803* (2013.01); *B60L 15/025* (2013.01); *B60L 15/2045* (2013.01); *B60W 10/00* (2013.01); *B60W 20/00* (2013.01); *B60L 2240/421* (2013.01); *B60L 2240/423* (2013.01); *B60L 2240/427* (2013.01); *B60L 2240/429* (2013.01); *B60L 2240/547* (2013.01); *B60L 2240/549* (2013.01); *B60L 2260/44* (2013.01); *Y02T 10/56* (2013.01);

(Continued)

(58) Field of Classification Search
CPC ................ B60W 20/00; B60W 10/08; B60W 2710/083; H02P 21/0035
See application file for complete search history.

(56) References Cited

U.S. PATENT DOCUMENTS

2008/0116842 A1   5/2008   Cheng et al.
2009/0237021 A1   9/2009   Yamamoto et al.
(Continued)

FOREIGN PATENT DOCUMENTS

EP     2093098 A1    8/2009
JP     2013-060175   4/2013
(Continued)

OTHER PUBLICATIONS

European Search Report for European Patent Application No. 14191294.9, dated Aug. 24, 2015, 7 pages.

*Primary Examiner* — Karen Masih
(74) *Attorney, Agent, or Firm* — Mintz Levin Cohn Ferris Glovsky and Popeo, P.C.; Peter F. Corless

(57) ABSTRACT

A control method of electric vehicle according to an exemplary embodiment of the present invention may include a battery supplying electricity, a motor receiving electricity from the battery and generating power, and a controller controlling the battery and the motor, wherein the controller executes instructions for: detecting a torque command, a motor speed, and a motor current; calculating a motor voltage from the motor current; determining whether voltage utilization according to a speed range of the motor is higher than a predetermined value; generating an operating point correcting function according to the motor speed when the voltage utilization is not higher than the predetermined value; calculating a current command according to the motor speed from the operating point correcting function; and outputting the calculated current command.

6 Claims, 3 Drawing Sheets

(51) Int. Cl.
  *B60L 15/20* (2006.01)
  *B60W 10/00* (2006.01)
  *B60W 20/00* (2016.01)
  *B60K 1/00* (2006.01)
  *B60L 3/12* (2006.01)
  *B60L 15/02* (2006.01)

(52) U.S. Cl.
  CPC ............ *Y02T10/643* (2013.01); *Y02T 10/7005* (2013.01); *Y02T 10/72* (2013.01); *Y02T 10/7283* (2013.01)

(56) References Cited

U.S. PATENT DOCUMENTS

2013/0147417 A1   6/2013   Kim et al.
2014/0046527 A1*  2/2014   Ito .................. B60W 30/20
                                                    701/22

FOREIGN PATENT DOCUMENTS

KR   10-2009-0130699   12/2009
KR      10-0992755     5/2010

* cited by examiner

CONTROL METHOD AND SYSTEM OF ELECTRIC VEHICLE

CROSS-REFERENCE TO RELATED APPLICATION

This application claims priority to and the benefit of Korean Patent Application No. 10-2013-0162932 filed in the Korean Intellectual Property Office on Dec. 24, 2013, the entire contents of which are incorporated herein by reference.

BACKGROUND OF THE INVENTION (a) Field of the Invention

The present invention relates to a control method of an electric vehicle. More particularly, the present invention relates to a control method of an electric vehicle that can reduce fuel consumption and cost by efficiently controlling a motor provided in the electric vehicle.

(b) Description of the Related Art

To solve environmental pollution problems and to develop alternative energy, an electric vehicle has been developed.

The electric vehicle includes a motor for driving the vehicle and a high voltage battery for supplying power to the motor. The battery is an energy source used to drive the motor, and can supply power to the motor through an inverter.

A MTPA (maximum torque per ampere) control method is one of motor control methods. The MTPA control method sets a current map by sweeping current supplied to the motor. The MTPA control method controls the motor by mathematical modeling, but there is a problem that nonlinearity of the motor cannot be represented by a mathematical equation when the motor is controlled by the equation.

In order to make up for the problem, a motor control method that sets a current map from an operating point that minimizes output current of the motor is used. At this time, the operating point can be calculated from an equal torque region obtained by current sweep. However, since the motor control method should consider a loss of the motor and the inverter, there is a problem that measuring factors (for example, motor torque, motor current, motor voltage, power factor of the motor, DC voltage, and DC current) are increased. As such, when various measuring factors are used, an output result is distorted by an error of a measuring sensor. Further, since various measuring factors are used, a measuring system is complicated and the system manufacturing cost is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control method of an electric vehicle that can reduce fuel consumption and cost by efficiently controlling a motor provided in an electric vehicle.

Further, the present invention has been made in an effort to provide a control method of an electric vehicle that can reduce cost of a motor control system and simplify the motor control system.

A control method of an electric vehicle according to an exemplary embodiment of the present invention may include a battery supplying electricity, a motor receiving electricity from the battery and generating power, and a controller controlling the battery and the motor, wherein the controller executes instructions for: detecting a torque command, a motor speed, and a motor current; calculating a motor voltage from the motor current; determining whether voltage utilization according to a speed range of the motor is higher than a predetermined value; generating an operating point correcting function according to the motor speed when the voltage utilization is not higher than the predetermined value; calculating a current command according to the motor speed from the operating point correcting function; and outputting the calculated current command.

The generating an operating point correcting function may include: determining a maximum efficient driving current map from a first motor speed; calculating a current magnitude and a current angle from the first motor speed; determining a maximum efficient operating point from a second motor speed; calculating a current magnitude and a current angle from the second motor speed; and generating the operating point correcting function from the current magnitude and the current angle calculated from the first motor speed and second motor speed.

The current map may be set from the first motor speed by sweeping DC current supplied from the battery.

The operating point may be set from the second motor speed by sweeping DC current supplied from the battery.

The generating the operating point correcting function may include:

calculating a difference of the current magnitude and a difference of current angle calculated from the first motor speed and second motor speed; and generating the operating point correcting function by approximating the difference.

The difference of the current magnitude and the current angle may be approximated by a quadratic function.

The control method of an electric vehicle further includes controlling the motor by overmodulation when the voltage utilization is higher than a predetermined value.

According to an exemplary embodiment of the present invention, since an optimal operating point is set according to a motor speed through an operating point correcting function, fuel consumption of a vehicle can be reduced.

Further, since measuring factors for controlling a motor can be minimized, system configuration can be simplified.

BRIEF DESCRIPTION OF THE DRAWINGS

The accompanying drawings are referenced to describe exemplary embodiments of the present invention, and therefore a technical spirit of the present invention is not to be construed to be limited to the accompanying drawings.

DETAILED DESCRIPTION OF THE EMBODIMENTS

Figure 1:
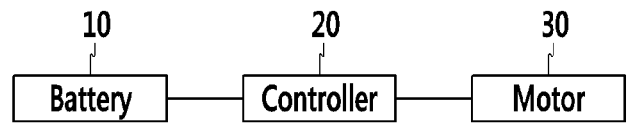
FIG. 1 is a block diagram illustrating an electric vehicle according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the magnitude and thickness of each configuration shown in the drawings are arbitrarily shown for better understanding and ease of description, but the present invention is not limited thereto. In the drawings, the thickness of layers, films, panels, regions, etc., are exaggerated for clarity.

A control method of an electric vehicle according to an exemplary embodiment of the present invention will now be described in detail with reference to drawings.

FIG. 1 is a block diagram illustrating an electric vehicle according to an exemplary embodiment of the present invention.

As shown in FIG. 1, an electric vehicle according to an exemplary embodiment of the present invention includes a battery 10 supplying electricity, a motor 30 receiving electricity from the battery 10 and generating power, and a controller 20 controlling the battery 10 and the motor 30.

The battery 10 supplies direct current power (DC power), and particularly supplies constant voltage power.

The controller 20 may be implemented with one or more microprocessors operated by a predetermined program or hardware including the microprocessor, and the predetermined program includes a series of commands for performing a control method of an electric vehicle according to an exemplary embodiment of the present invention to be described below. Generally, the controller 20 may be an inverter receiving electricity from the battery 10 and controlling the motor 30.

Hereinafter, a control method of an electric vehicle according to an exemplary embodiment of the present invention will be described in detail.

Figure 2:
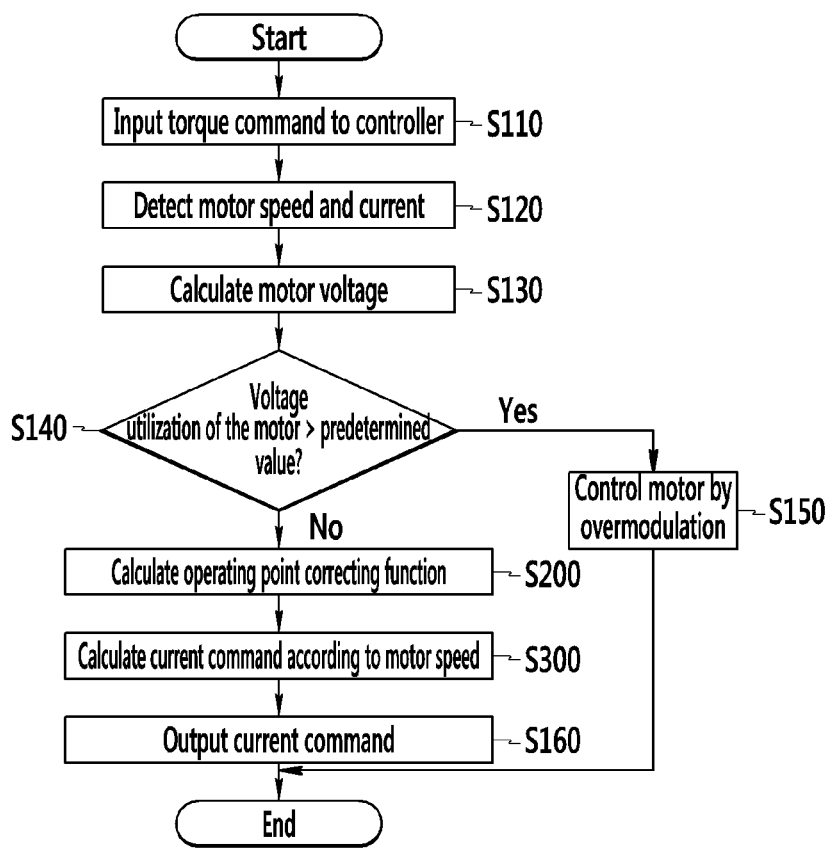
FIG. 2 is a flowchart illustrating a control method of an electric vehicle according to an exemplary embodiment of the present invention.

FIG. 2 is a flowchart illustrating a control method of an electric vehicle according to an exemplary embodiment of the present invention.

As shown in FIG. 2, when a torque command is inputted to the controller 20 at step S110, the controller 20 detects a motor speed and current at step S120, and the controller 20 calculates a motor voltage from the motor current at step S130.

The controller 20 determines whether voltage utilization of the motor 30 is higher than 1 at step S140.

When the voltage utilization of the motor is higher than 1, the controller determines that a lot of voltage is used in a relatively high speed range and controls the motor 30 by overmodulation at step S150.

The overmodulation control method is generally used in the art, and detailed description thereof will not be provided.

When the voltage utilization of the motor 30 is not higher than 1, the controller 20 calculates an operating point correcting function according to the motor speed at step S200.

Figure 3:
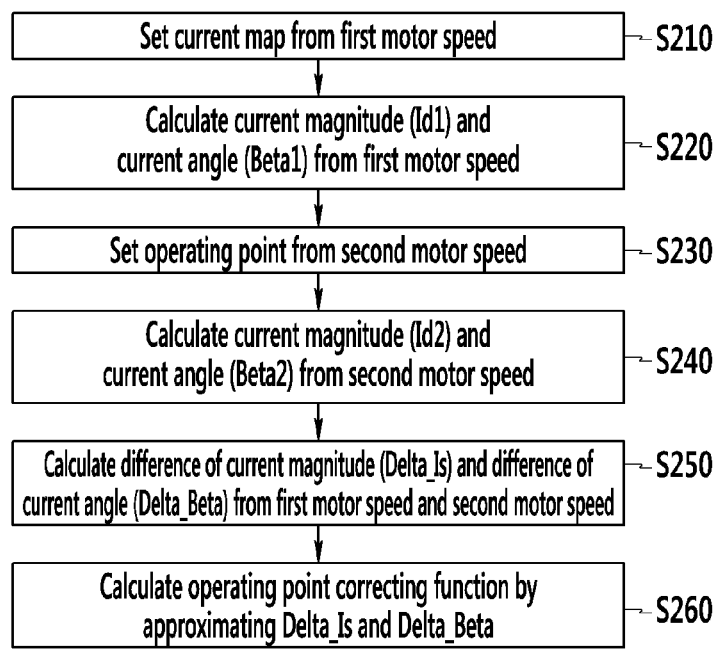
FIG. 3 is a flowchart illustrating a method for obtaining an operating point correcting function according to an exemplary embodiment of the present invention.

Hereinafter, the S200 step of a method for obtaining an operating point correcting function according to the motor speed will be described in detail referring to FIG. 3.

The controller 20 sets a current map with respect to a first motor speed by sweeping direct current supplied from the battery 10 at step S210. The first motor speed may be 1500 RPM.

The controller 20 calculates a magnitude and angle of a d-axis current (Id1) and a q-axis current (Iq1), and an angle (Beta1) of the d-axis current (Id1) and the q-axis current (Iq1) in a synchronous reference frame with respect to a torque command at the first motor speed at step S220.

The controller 20 sets an operating point with respect to a second motor speed by sweeping direct current supplied from the battery 10 at step S230.

The controller 20 calculates a magnitude of a d-axis current (Id2) and a q-axis current (Iq2), and an angle (Beta2) of the d-axis current (Id2) and the q-axis current (Iq2) with respect to the second motor speed at step S240.

The controller 20 calculates a difference of a current magnitude and a difference of a current angle from a magnitude and an angle of the d-axis current (Id1) and the q-axis current (Is1) obtained by the first motor speed and a magnitude and an angle of the d-axis current (Ids) and the q-axis current (Is1) obtained by the second motor speed at step S250. The difference (Delta_Is) of the current magnitude is a difference between Is1 and Is2. The difference (Delta_Beta) of the current angle is a difference between Beta1 and Beta2. The difference (Delta_Is) of the current magnitude and the difference (Delta_Beta) of the current angle fulfill the following equations.

$$Delta\_Is = Is2 - Is1$$

$$Delta\_Beta = Beta2 - Beta1$$

The controller 20 approximates the difference of the current magnitude (Delta_Is) and the difference of the current angle (Delta_Beta), and calculates an operating point correcting function (Func_Delta_Is, Func_Delta_Beta) at step S260.

The controller 20 can obtain a maximum efficiency operating point in overall speed range by interpolating the d-axis current (Id1) calculated from the first motor speed and the d-axis current (Id2) calculated from the second motor speed, and by interpolating the q-axis current (Iq1) calculated from the first motor speed and the q-axis current (Iq2) calculated from the second motor speed. Here, the controller 20 may calculate the operating point correcting function by a linear function or a quadratic function, when the controller 20 interpolates the d-axis current (Id1) calculated from the first motor speed and the d-axis current (Id2) calculated from the second motor speed, or when the q-axis current (Iq1) calculated from the first motor speed and the q-axis current (Iq2) calculated from the second motor speed.

Referring to FIG. 2, the controller 20 calculates a current command with respect to the motor speed by using the operating point correcting function at step S300.

Figure 4:
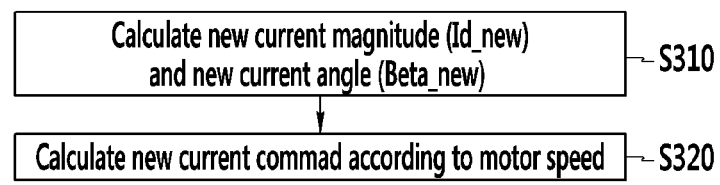
FIG. 4 is a flowchart illustrating a method for obtaining a new current command according to an exemplary embodiment of the present invention.

As shown in FIG. 4, the controller 20 calculates a new current magnitude (Is_new) and a new current angle (Beta_new) by using the operating point correcting function at step S310. At this time, the new current magnitude (Is_new) and the new current angle (Beta_new) can be calculated by the following equations.

$$Is\_new = Is1 + Func\_Delta\_Is \, (\text{real motor speed} - \text{first motor speed})$$

$$Beta\_new = Beta1 + Func\_Delta\_Beta \, (\text{real motor speed} - \text{first motor speed})$$

Here, the Func_Delta_Is( ) is the operating point correcting function of a current magnitude, and the Func_Delta_Beta( ) is the operating point correcting function of a current angle.

The controller 20 calculates a new d-axis current command (Id_new) and a new q-axis current command (Iq_new) in a synchronous reference frame from the new current magnitude (Is_new) and the new current angle (Beta_new) at step S320.

The new d-axis current command (Id_new) and the new q-axis current command (Iq_new) can be calculated from the following equations.

$$Id\_new = -Is\_new * \cos(180 - Beta\_new)$$

$$Iq\_new = Is\_new * \sin(180 - Beta\_new)$$

Referring to FIG. 2, the controller 20 outputs the new d-axis current command (Id_new) and the new q-axis current command (Ig_new) to the motor 30.

Figure 5:
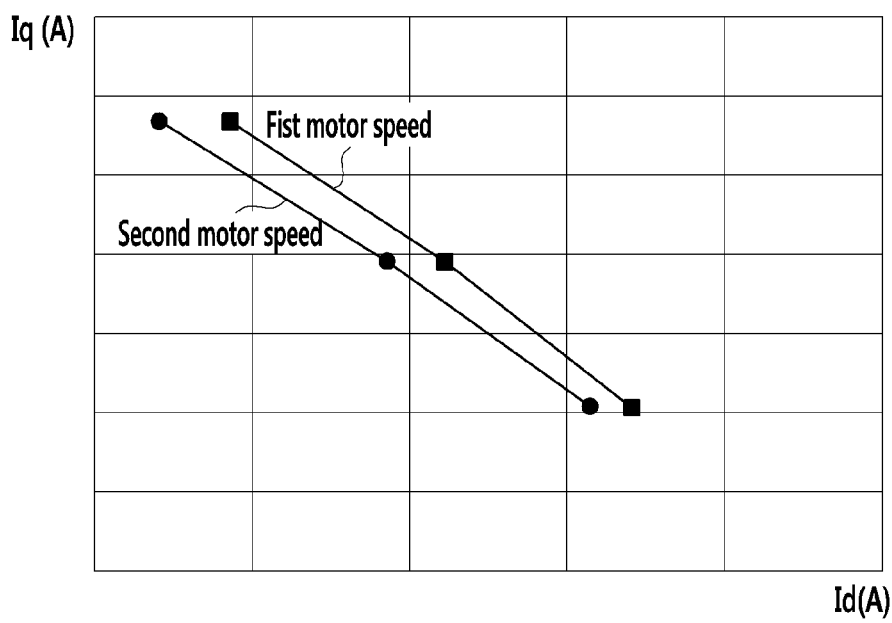
FIG. 5 is a graph illustrating an operating point according to motor speed.

FIG. 5 is a graph illustrating an operating point according to a motor speed. That is, FIG. 5 illustrates an operating point obtained from the first motor speed (1500 RPM) and an operating point obtained from the second motor speed (2000 RPM).

Generally, as the motor speed increases, core loss of the motor increases. By an influence of the core loss, the maximum efficiency operating point needs more d-axis current in a negative direction. Since the core loss increases as the motor speed increases, the maximum efficiency operating point is different for each motor speed.

As such, according to an exemplary embodiment of the present invention, since the motor 30 is controlled including variation of core loss according to motor speed, maximum efficiency driving according to motor speed is possible.

In an exemplary embodiment of the present invention, a current map is set for one motor speed. That is, the current map is set by using only motor torque and direct current of the battery 10. As such, if the motor is controlled while constantly maintaining a voltage of the battery 10, the output of the battery 10 is determined by DC current of the battery 10 (battery output=battery voltage*battery current). Also, if an equal torque of a curve is determined by current sweep, the output of the motor 30 becomes equivalent (motor output=motor speed*motor torque).

That is, the maximum efficiency operating point of the motor system of which the input is the output of the battery and the output is the motor output, is when the output of the battery 10 is minimum, since the output of the motor 30 is equivalent. In other words, since the output of the battery 10 is constant, the maximum efficient operating point is the minimum point of DC current.

Therefore, according to an exemplary embodiment of the present invention, a current map determined by using direct current of the battery and required torque becomes a maximum efficiency current map. By using this method, a measuring error can be reduced and a measuring system can be simplified, since the measuring factor is reduced compared to prior art.

Further, according to an exemplary embodiment of the present invention, since the motor is controlled by measuring direct current of the battery, it is possible to control the motor considering efficiency of the inverter. Further, according to an exemplary embodiment of the present invention, a voltage outputted from the batter is maintained constantly. Therefore, when minimum input power (direct voltage*direct current) is found by verifying direct current of the battery, an operating point of maximum efficiency (minimum loss) can be obtained.

By using this method, since the operating point is found including influence of copper loss and core loss of the motor, fuel consumption can be reduced.

DESCRIPTION OF SYMBOLS

10: battery
20: controller
30: motor

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method of an electric vehicle, comprising a battery supplying electricity, a motor receiving electricity from the battery and generating power, and a controller controlling the battery and the motor, wherein the controller executes instruction for:
   detecting a torque command, a motor speed, and a motor current;
   calculating a motor voltage from the motor current;
   determining whether voltage utilization according to a speed range of the motor is higher than a predetermined value;
   generating an operating point correcting function according to the motor speed when the voltage utilization is not higher than the predetermined value, wherein the generating the operating point correcting function further comprises:
      determining a maximum efficient driving current map from a first motor speed;
      calculating a current magnitude and a current angle from the first motor speed;
      determining a maximum efficient operating point from a second motor speed;
      calculating a current magnitude and a current angle from the second motor speed; and
      generating the operating point correcting function from the current magnitude and the current angle calculated from the first motor speed and the second motor speed;
   calculating a current command according to the motor speed from the operating point correcting function; and
   outputting the calculated current command.

2. The control method of electric vehicle of claim 1, wherein the current map is set from the first motor speed by sweeping a DC current supplied from the battery.

3. The control method of electric vehicle of claim 1, wherein the operating point is set from the second motor speed by sweeping a DC current supplied from the battery.

4. The control method of electric vehicle of claim 1, wherein the generating the operating point correcting function comprises:
   calculating a difference of the current magnitude and a difference of current angle calculated from the first motor speed and the second motor speed; and
   generating the operating point correcting function by approximating the difference.

5. The control method of electric vehicle of claim 4, wherein the difference of the current magnitude and the current angle is approximated by a quadratic function.

6. The control method of electric vehicle of claim 1, further comprising:
   controlling the motor by overmodulation when the voltage utilization is higher than a predetermined value.

* * * * *